(12) United States Patent  
Chen et al.

(10) Patent No.: US 12,433,725 B2  
(45) Date of Patent: Oct. 7, 2025

(54) METHOD AND SYSTEM FOR PROCESSING INTRAORAL SCANNING, ELECTRONIC DEVICE, AND MEDIUM

(71) Applicant: SHINING 3D TECH CO., LTD., Zhejiang (CN)

(72) Inventors: Xiaojun Chen, Zhejiang (CN); Chao Ma, Zhejiang (CN); Wei Zhang, Zhejiang (CN); Xiaobo Zhao, Zhejiang (CN)

(73) Assignee: SHINING 3D TECH CO., LTD., Zhejiang (CN)

( * ) Notice: Subject to any disclaimer, the term of this patent is extended or adjusted under 35 U.S.C. 154(b) by 0 days.

(21) Appl. No.: 18/707,883

(22) PCT Filed: Apr. 28, 2023

(86) PCT No.: PCT/CN2023/091810  
§ 371 (c)(1),  
(2) Date: May 7, 2024

(87) PCT Pub. No.: WO2023/213254  
PCT Pub. Date: Nov. 9, 2023

(65) Prior Publication Data  
US 2024/0423762 A1    Dec. 26, 2024

(30) Foreign Application Priority Data  
May 2, 2022    (CN) .......................... 202210477085.7

(51) Int. Cl.  
A61C 9/00    (2006.01)  
G06T 7/521    (2017.01)  
(Continued)

(52) U.S. Cl.  
CPC .............. *A61C 9/006* (2013.01); *G06T 7/521* (2017.01); *G06T 7/55* (2017.01); *G06T 17/10* (2013.01);  
(Continued)

(58) Field of Classification Search  
CPC   A61C 9/006; G06T 7/55; G06T 7/521; G06T 17/10  
See application file for complete search history.

(56) References Cited

U.S. PATENT DOCUMENTS

2012/0022604 A1*   1/2012   Polley .................. A61B 17/176  
606/86 R  
2012/0065943 A1*   3/2012   Fisker .................... A61C 13/30  
703/1

(Continued)

FOREIGN PATENT DOCUMENTS

CN    105287039 A    2/2016  
CN    207506563 U    6/2018  
(Continued)

OTHER PUBLICATIONS

The first office action of counterpart EP application No. 23799240.9 was issued on Jan. 7, 2025.

(Continued)

*Primary Examiner* — Nicholas D Lucchesi  
(74) *Attorney, Agent, or Firm* — Scully, Scott, Murphy & Presser, P.C.

(57) ABSTRACT

Embodiments of the present disclosure relate to a method and system for processing intraoral scanning, an electronic device, and a medium. The method includes: obtaining a positioning mode of a scan post in response to a request for scanning an oral cavity including scan posts, scanning the oral cavity to obtain target scanning data, and performing processing based on the positioning mode of the scan post (Continued)

and the target scanning data to determine positioning information of the scan posts.

18 Claims, 3 Drawing Sheets

(51) Int. Cl.
  *G06T 7/55* (2017.01)
  *G06T 17/10* (2006.01)
(52) U.S. Cl.
  CPC  *G06T 2200/08* (2013.01); *G06T 2207/10028* (2013.01); *G06T 2207/30036* (2013.01); *G06T 2210/41* (2013.01)

(56) References Cited

U.S. PATENT DOCUMENTS

| | | | | |
|---|---|---|---|---|
| 2013/0189646 | A1* | 7/2013 | Hochman | A61C 19/04 433/174 |
| 2013/0209965 | A1* | 8/2013 | Fisker | A61C 9/0046 433/220 |
| 2014/0372084 | A1* | 12/2014 | Cowburn | A61C 13/0004 703/1 |
| 2016/0026253 | A1 | 1/2016 | Bradski et al. | |
| 2017/0112592 | A1* | 4/2017 | Groscurth | A61C 1/084 |
| 2018/0125619 | A1* | 5/2018 | Jahn | A61C 8/0001 |
| 2019/0282342 | A1 | 9/2019 | Aubailly et al. | |
| 2020/0008848 | A1* | 1/2020 | Hale | B22F 10/28 |
| 2021/0131798 | A1 | 5/2021 | Lee et al. | |
| 2021/0295545 | A1 | 9/2021 | Ma | |
| 2022/0130045 | A1 | 4/2022 | Kopelman | |
| 2022/0183732 | A1* | 6/2022 | Hale | A61C 8/0074 |

FOREIGN PATENT DOCUMENTS

| | | |
|---|---|---|
| CN | 109584352 A | 4/2019 |
| CN | 213190255 U | 5/2021 |
| CN | 112985307 A | 6/2021 |
| CN | 113483695 A | 10/2021 |
| CN | 114052960 A | 2/2022 |
| CN | 114831756 A | 8/2022 |
| JP | 2022523841 A | 4/2022 |

OTHER PUBLICATIONS

The first office action of counterpart JP application No. 2024539389 was issued on Feb. 4, 2025.

* cited by examiner

METHOD AND SYSTEM FOR PROCESSING INTRAORAL SCANNING, ELECTRONIC DEVICE, AND MEDIUM

The present disclosure claims priority to Chinese Patent Application No. 202210477085.7, entitled "METHOD AND SYSTEM FOR PROCESSING INTRAORAL SCANNING, ELECTRONIC DEVICE, AND MEDIUM" filed with China National Intellectual Property Administration on May 2, 2022, which is incorporated herein by reference in its entirety.

TECHNICAL FIELD

The present disclosure relates to the technical field of intraoral scanning, and in particular to a method and system for processing intraoral scanning, an electronic device, and a medium.

BACKGROUND

Typically, in a scenario of restoring missing teeth within an oral cavity, scan posts perform scanning to determine an implant position.

In the related art, due to the limitation of the scanning range of an intraoral scanner, a multi-data stitching solution is usually used when intraoral data is scanned. Due to the existence of cumulative errors, intraoral scanning data ultimately obtained by the scanner cannot determine accurate positions of the scan posts, and as a result, accuracy of scanning implantation is poor.

SUMMARY

Embodiments of the present disclosure provide a method and system for processing intraoral scanning, an electronic device, and a medium.

A method for processing intraoral scanning is provided in embodiments of the disclosure. The method includes:
   obtaining a positioning mode of a scan post in response to a request for scanning an oral cavity including scan posts;
   scanning the oral cavity to obtain target scanning data; and
   performing processing based on the positioning mode of the scan post and the target scanning data to determine positioning information of the scan posts.

A system for processing intraoral scanning is further provided in embodiments of the disclosure, and includes a scanner and a processing component.

The scanner is configured to obtain a positioning mode of a scan post in response to a request for scanning an oral cavity including scan posts, and scan the oral cavity to obtain target scanning data; and
   the processing component is configured to perform processing based on the positioning mode of the scan post and the target scanning data to determine positioning information of the scan posts.

An electronic device is further provided in embodiments of the disclosure, and includes:
   a processor; and
   a memory configured to store executable instructions of the processor.
   The processor is configured to:
   read the executable instructions from the memory, and execute the instructions to implement the method for processing intraoral scanning provided by the embodiment of the present disclosure.

A computer storage medium is further provided in embodiments of the disclosure. The computer storage medium can store a program. The program, when executed, can implement some or all of the steps in various implementations for the method for processing intraoral scanning provided in the embodiments of the present disclosure.

It should be understood that the above general description and the following detailed description are only exemplary and explanatory, and cannot limit the present disclosure.

BRIEF DESCRIPTION OF FIGURES

Accompanying drawings herein are incorporated into a specification to form a part of the specification, illustrate embodiments conforming to the present disclosure, and are used for explaining the principle of the present disclosure together with the specification.

In order to describe technical solutions in embodiments of the present disclosure or in the prior art more clearly, the accompanying drawings required to be used in descriptions of the embodiments or the prior art will be briefly introduced below, and it is apparent that those of ordinary skill in the art can obtain other drawings according to these accompanying drawings without creative work.

DETAILED DESCRIPTION

To make objectives, technical solutions, and advantages of embodiments of the present disclosure more clear, the technical solutions in the embodiments of the present disclosure are clearly and completely described as below, and it is apparent that the described embodiments are a part rather all of embodiments of the present disclosure. Based on the embodiments of the present disclosure, all other embodiments obtained by those of ordinary skill in the art without creative work shall fall within the scope of protection of the present disclosure.

Figure 1:
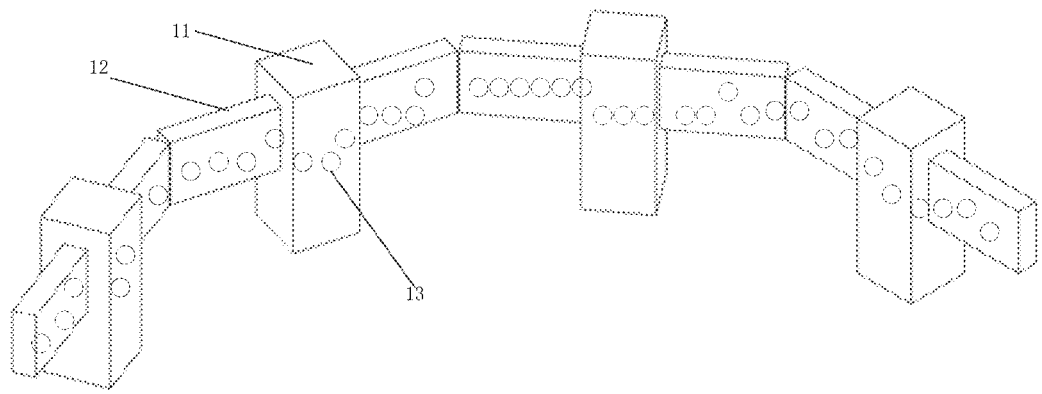
FIG. 1 is a diagram of an application scenario of intraoral scanning processing according to some embodiments of the present disclosure.

In response to the above problems, the present disclosure provides a method for processing intraoral scanning, which can be applied to an application environment shown in FIG. 1. FIG. 1 is a diagram of an application scenario of processing intraoral scanning according to some embodiments of the present disclosure. The application scenario includes: installing a plurality of intraoral scan posts in a target oral cavity. The intraoral scan post includes: a scan post component 11 and an auxiliary component 12 connected with the scan post component 11. The scan post component 11 and/or the auxiliary component 12 are/is provided with auxiliary feature points, where shape features of the auxiliary component 12 may also serve as auxiliary feature points. The scan post component 11 is adaptive to an implant installed in the target oral cavity, and through adaptive installation of the scan post component 11 and the implant, the intraoral scan post is installed in the target oral cavity.

The auxiliary components 12 of any two of the plurality of intraoral scan posts are adaptive to each other, such that when the any two intraoral scan posts 10 are adjacently installed in the oral cavity, the auxiliary feature points on the two auxiliary components are continuously distributed. True value coordinate points of the auxiliary feature points can be obtained in advance through a single-lens reflex photogrammetry system, a coordinate measuring machine, etc. In theory, three-dimensional coordinate points corresponding to an image obtained through scanning are in one-to-one correspondence with the true value coordinate points of the auxiliary feature points obtained in advance.

In some embodiments of the present disclosure, an intraoral scanner is also called an electronic impression scanner, which applies a small probe type optical scanning head to directly acquire three-dimensional shape and color texture information of surfaces of soft or hard tissues such as teeth, gums, and mucosa in the oral cavity of a patient.

As an example scenario, a plurality of intraoral scan posts are installed in the target oral cavity. The intraoral scan post includes a scan post component used for being connected with the implant, and an auxiliary component connected with the scan post component. The intraoral scan post has target features, and the target features are continuously distributed on the scan post component and/or the auxiliary component, and are distributed non-unilaterally on the scan post component and/or the auxiliary component.

The intraoral scanner scans the target oral cavity to obtain a plurality of frames of images, and transmits the images to a data processing component for data processing. The data processing component executes the following method:

A plurality of frames of images are obtained, initial three-dimensional data of the target oral cavity is acquired based on the plurality of frames of images, and the initial three-dimensional data includes an initial point set of the target oral cavity and three-dimensional coordinate measured values of the target features in the same coordinate system.

A preset model of the intraoral scan post is obtained, and includes three-dimensional coordinate true values of the target features and a real point set (three-dimensional coordinate true values of various points) of the intraoral scan post in the same coordinate system.

The initial point set of the target oral cavity and the real point set of the intraoral scan post are stitched based on a corresponding relationship between the three-dimensional coordinate measured values of the target features and the true values.

Positioning information of the intraoral scan post is determined based on the stitched real point set of the intraoral scan post, the positioning information of the intraoral scan post is positioning information of the implant, and dental prosthesis design is performed based on the positioning information, such that a designed and manufactured dental prosthesis can be adaptively installed with the implant.

In response to a request for scanning the oral cavity including the scan posts, a positioning mode of a scan post is obtained, and the oral cavity is scanned to obtain target scanning data. Processing is performed based on the positioning mode of the scan post and the target scanning data to determine positioning information of the scan posts. By adopting the above technical solution, the positioning information of the scan posts can be acquired based on a scanning result, and the requirement for positioning the scan posts in an intraoral scanning scenario is further satisfied.

Figure 2:
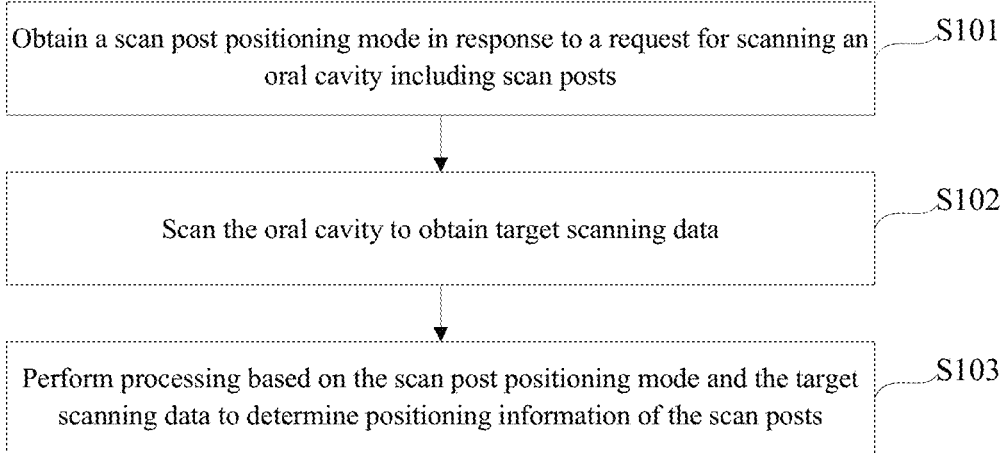
FIG. 2 is a schematic flowchart of a method for processing intraoral scanning according to some embodiments of the present disclosure.

FIG. 2 is a schematic flowchart of a method for processing intraoral scanning according to some embodiments of the present disclosure. The method can be executed by an apparatus for processing intraoral scanning. The apparatus can be implemented by software and/or hardware, and can be typically integrated in an electronic device. As shown in FIG. 2, the method includes the following steps:

Step 101: In response to a request for scanning an oral cavity including scan posts, a positioning mode of a scan post is obtained.

The oral cavity refers to an oral cavity needing dental implanting. Intraoral scanning needs to be performed so as to locate coordinates of specific points in the oral cavity. The scan posts in the oral cavity are connected through auxiliary feature bodies for intraoral scanning.

In the embodiments of the present disclosure, the scan post and/or the auxiliary feature body include/includes auxiliary feature points (e.g., circles, squares, and checkerboards), and the auxiliary feature body has various shapes (e.g., spheres, squares, cuboids, and cones).

The scanner has different scanning modes that can be selected based on the application scenario, such as a normal scanning mode and a positioning mode of a scan post. Different scanning modes have different subsequent processing methods for scanning data.

In the embodiments of the present disclosure, a user triggers a scan start button disposed on the scanner, the request for scanning the oral cavity including the scan posts can be received, scanning request parameters are further acquired, for example, 1 represents a normal scanning scenario, and 0 represents a scan post positioning scanning scenario, such that the corresponding scanning mode is determined based on different scanning request scenarios.

In the embodiments of the present disclosure, after triggering the scan start button disposed on the scanner, the user can trigger a scanning mode selection button disposed on the scanner to directly obtain the scanning mode.

After the oral cavity is connected with the scan posts, the positioning mode of the scan post is obtained in response to the request for scanning the oral cavity including the scan posts.

Step 102: The oral cavity is scanned to obtain target scanning data.

The target scanning data may include structured light images and/or texture images.

In the embodiments of the present disclosure, there are various methods for scanning the oral cavity to obtain target scanning data. In some implementations, a scanner projector is controlled to project a structured light pattern onto the oral cavity, and a first camera is controlled to perform image acquisition to obtain structured light images. A lighting element is controlled to project illumination light onto the oral cavity, and a second camera is controlled to perform image acquisition to obtain texture images. The structured light images and the texture images are taken as the target scanning data.

In some other implementations, structured light images and texture images are obtained directly through camera captures. The above two methods are only examples for scanning the oral cavity to obtain the target scanning data. The embodiment of the present disclosure does not limit a specific method for scanning the oral cavity to obtain the target scanning data.

In the embodiments of the present disclosure, after responding to the request for scanning the oral cavity including the scan posts, the oral cavity can be scanned to obtain the target scanning data.

Step 103: Processing is performed based on the positioning mode of the scan post and the target scanning data to determine positioning information of the scan posts.

Different scanning modes have different subsequent processing methods. In the positioning mode of the scan post, the target scanning data needs to be processed to determine the positioning information of the scan posts.

In an implementation of the present disclosure, in the positioning mode of the scan post, auxiliary feature point information of the texture images is extracted, three-dimensional reconstruction is performed based on the auxiliary feature point information to obtain three-dimensional data of the auxiliary feature points, a scan post three-dimensional model is determined based on the three-dimensional data of the auxiliary feature points, and the positioning information of the scan posts is determined based on the scan post three-dimensional model.

In another implementation of the present disclosure, based on pixel coordinates of the structured light image, pixel coordinates of the texture image, and internal and external parameters of the cameras, texture mapping is performed on the three-dimensional model and color information, and the auxiliary feature point information in the texture image is extracted. Three-dimensional reconstruction of the three-dimensional data of the auxiliary feature points is performed based on the auxiliary feature point information. The scan post three-dimensional model is determined based on the three-dimensional data of the auxiliary feature points. The positioning information of the scan posts is determined based on the scan post three-dimensional model.

Each of the auxiliary feature points can uniquely identify one feature. That is, the scan post is provided with the auxiliary feature points, and each auxiliary feature point can uniquely identify a corresponding position feature on the scan post. For example, a target feature a and a target feature b are respectively set for a position 1 and a position 2 on the scan post, the target feature a can uniquely identify the position feature of the position 1 on the scan post, and the target feature b can uniquely identify the position feature of the position 2 on the scan post.

It should be understood that different shapes, colors, two-dimensional codes, etc. on the scan post that can uniquely identify the corresponding position features on the scan post can be taken as the auxiliary feature points. It can also be understood that the auxiliary feature points can be the shape features of the auxiliary component 12 itself.

After the target scanning data is obtained, processing can be performed based on the positioning mode of the scan post and the target scanning data to determine the positioning information of the scan posts.

According to the intraoral scanning processing solution provided by this embodiment of the present disclosure, the positioning mode of the scan post is obtained in response to the request for scanning the oral cavity including the scan posts, and the oral cavity is scanned to obtain the target scanning data. Processing is performed based on the positioning mode of the scan post and the target scanning data to determine the positioning information of the scan posts. By adopting the above technical solution, the positioning information of the scan posts can be acquired based on a scanning result, and the requirement for positioning the scan posts in an intraoral scanning scenario is further satisfied.

Based on the description of the above embodiment, a method for processing intraoral scanning in a specific scenario is described in detail in conjunction with FIG. 3 below.

Figure 3:
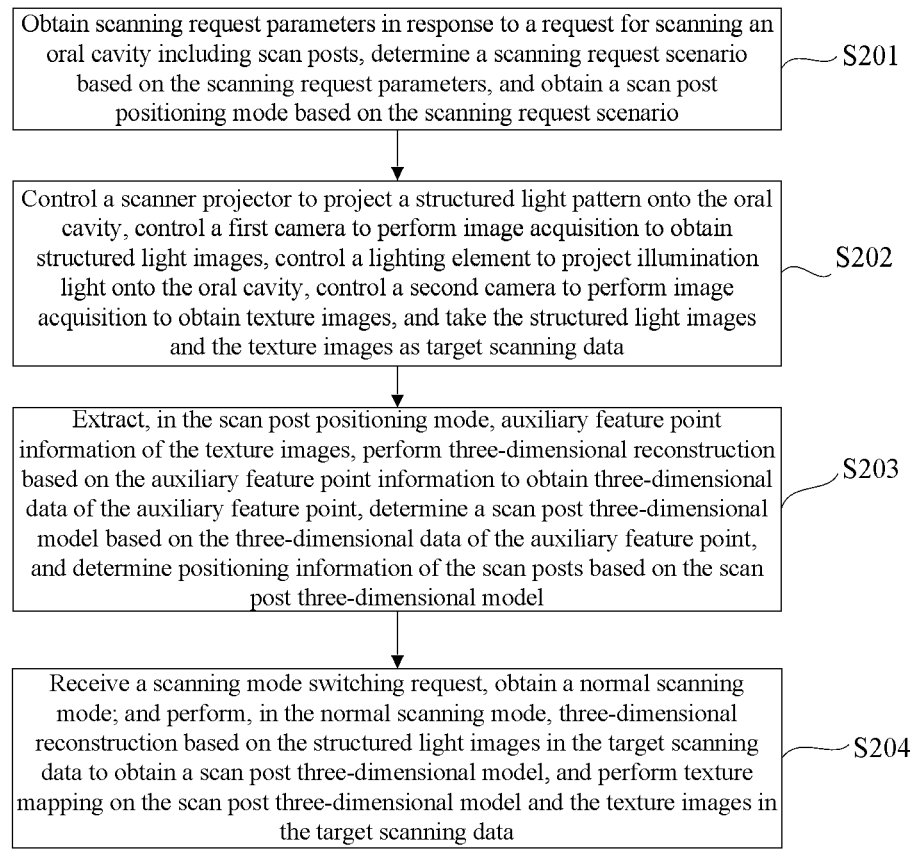
FIG. 3 is a schematic flowchart of another method for processing intraoral scanning according to some embodiments of the present disclosure.

FIG. 3 is a schematic flowchart of another method for processing intraoral scanning according to some embodiments of the present disclosure. In the embodiment, the above method for processing intraoral scanning is further optimized based on the above embodiment. As shown in FIG. 3, the method includes the following steps:

Step 201: In response to a request for scanning an oral cavity including scan posts, scanning request parameters are obtained, a scanning request scenario is determined based on the scanning request parameters, and based on the scanning request scenario, a positioning mode of a scan post is obtained.

When the scanning request for the oral cavity is received, the scanning request is parsed to obtain the scanning request parameters. It should be understood that the scanning request parameters can uniquely identify one scanning request scenario, such as a normal scanning scenario or a scan post positioning scenario. Therefore, different positioning modes of the scan post are obtained according to different scanning request scenarios, such as a normal scanning mode or a positioning mode of a scan post.

Step 202: A scanner projector is controlled to project a structured light pattern onto the oral cavity, a first camera is controlled to perform image acquisition to obtain structured light images, a lighting element is controlled to project illumination light onto the oral cavity, a second camera is controlled to perform image acquisition to obtain texture images, and the structured light images and the texture images are taken as target scanning data.

Step 203: In the positioning mode of the scan post, auxiliary feature point information of the texture images is extracted, three-dimensional reconstruction is performed based on the auxiliary feature point information to obtain three-dimensional data of the auxiliary feature points, a scan post three-dimensional model is determined based on the three-dimensional data of the auxiliary feature points, and the positioning information of the scan posts is determined based on the scan post three-dimensional model The scanner projector is controlled to project the structured light pattern onto the oral cavity. The first camera is used for performing image acquisition. After the structured light images and the texture images are collected, three-dimensional reconstruction is performed to obtain a structured light image sequence and a texture image sequence. The three-dimensional data including teeth, gums, and the scan posts is calculated according to the structured light image sequence, and the three-dimensional data of the auxiliary feature points is reconstructed using the texture image sequence. Simultaneous acquisition of the structured light images and texture images may be considered as the three-dimensional data being in one-to-one correspondence with the three-dimensional data of the auxiliary feature points in the same coordinate system.

When the collected three-dimensional data of the auxiliary feature points is successfully stitched with preset true value coordinate points of the auxiliary feature points, a position transformation matrix can be utilized for transforming designed scan post data into an auxiliary feature point coordinate system to replace the scan post three-dimensional model acquired in real time.

Step 204: A scanning mode switching request is received, the normal scanning mode is obtained; and in the normal scanning mode, three-dimensional reconstruction is performed based on the structured light images in the target scanning data to obtain a scan post three-dimensional model, and texture mapping is performed on the scan post three-dimensional model and the texture images in the target scanning data.

After the scanning mode is switched to the normal scanning mode, three-dimensional reconstruction can be performed based on the structured light images to obtain the scan post three-dimensional model, and texture mapping is performed on the scan post three-dimensional model and the texture images in the target scanning data.

According to the intraoral scanning processing solution provided by this embodiment of the present disclosure, in response to the request for scanning the oral cavity including the scan posts, the scanning request parameters are obtained, the scanning request scenario is determined based on the scanning request parameters, and based on the scanning request scenario, the positioning mode of the scan post is obtained. The scanner projector is controlled to project the structured light pattern onto the oral cavity, the first camera is controlled to perform image acquisition to obtain the structured light images, the lighting element is controlled to project the illumination light onto the oral cavity, the second camera is controlled to perform image acquisition to obtain the texture images, and the structured light images and the texture images are taken as the target scanning data. In the positioning mode of the scan post, the auxiliary feature point information of the texture images is extracted, three-dimensional reconstruction is performed based on the auxiliary feature point information to obtain the three-dimensional data of the auxiliary feature points, the scan post three-dimensional model is determined based on the three-dimensional data of the auxiliary feature points, and the positioning information of the scan posts is determined based on the scan post three-dimensional model. The scanning mode switching request is received, the normal scanning mode is obtained, and in the normal scanning mode, three-dimensional reconstruction is performed based on the structured light images in the target scanning data to obtain the scan post three-dimensional model, and texture mapping is performed on the scan post three-dimensional model and the texture images in the target scanning data. Therefore, different scanning modes are determined based on the scanning request, and different processing is performed on the scanning data based on the different scanning modes so as to satisfy intraoral scanning data processing requirements in different scenarios, thereby further improving the processing efficiency and accuracy of intraoral scanning implantation.

Figure 4:
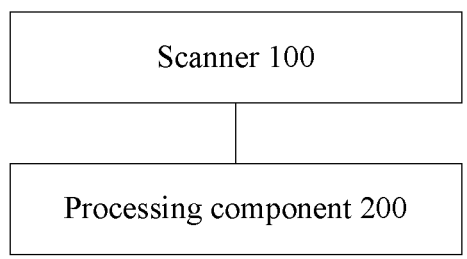
FIG. 4 is a schematic structural diagram of a system for processing intraoral scanning according to some embodiments of the present disclosure.

FIG. 4 is a schematic structural diagram of a system for processing intraoral scanning according to some embodiments of the present disclosure. The system can be implemented by software and/or hardware, and can be typically integrated in an electronic device. As shown in FIG. 4, the system includes: a scanner 100 and a processing component 200.

The scanner 100 is configured to obtain a positioning mode of a scan post in response to a request for scanning an oral cavity including scan posts, and scan the oral cavity to obtain target scanning data.

The processing component 200 is configured to perform processing based on the positioning mode of the scan post and the target scanning data to determine positioning information of the scan posts.

The scanner 100 is configured to:
obtain scanning request parameters based on the scanning request;
determine a scanning request scenario based on the scanning request parameters; and
obtain the positioning mode of the scan post based on the scanning request scenario.

The scanner 100 includes a projector 110, a first camera 120, a lighting element 130, and a second camera 140.

The projector 110 projects a structured light pattern onto the oral cavity, the first camera 120 performs image acquisition, and obtained structured light images are taken as the target scanning data.

The lighting element 130 projects illumination light onto the oral cavity, the second camera 140 performs image acquisition, and obtained texture images are taken as the target scanning data.

The first camera 120 and the second camera 140 may be the same camera or two different cameras. There may also be a plurality of first cameras 120 or a plurality of second cameras 140.

The processing component is configured to:
extract auxiliary feature point information of the texture images in the positioning mode of the scan post;
perform three-dimensional reconstruction based on the auxiliary feature point information to obtain three-dimensional data of auxiliary feature points; and
determine a scan post three-dimensional model based on the three-dimensional data of the auxiliary feature points, and determine the positioning information of the scan posts based on the scan post three-dimensional model.

The scanner 100 is further configured to:
receive a scanning mode switching request, and obtain a normal scanning mode.

The processing component 200 is further configured to:
perform, in the normal scanning mode, three-dimensional reconstruction based on structured light images in the target scanning data to obtain a scan post three-dimensional model, and perform texture mapping on the scan post three-dimensional model and texture images in the target scanning data.

The system for processing intraoral scanning provided by the embodiment of the present disclosure can execute the method for processing intraoral scanning provided by any embodiments of the present disclosure, and has corresponding functional components and beneficial effects for executing the method.

An embodiment of the present disclosure further provides a computer storage medium. The computer storage medium can store a program. The program, when executed, can implement some or all of the steps in various implementations for the method for processing intraoral scanning provided by the embodiments shown in FIG. 2 and FIG. 3.

Figure 5:
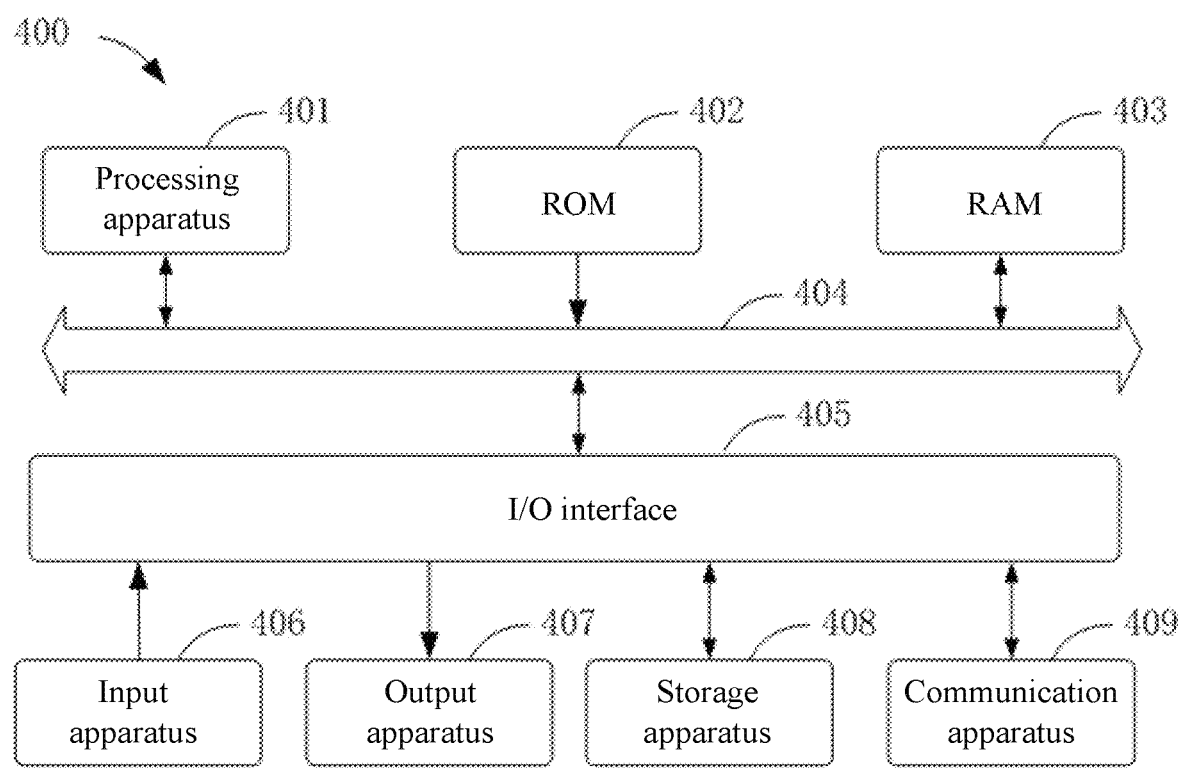
FIG. 5 is a schematic structural diagram of an electronic device according to some embodiments of the present disclosure.

An embodiment of the present disclosure further provides an electronic device. As shown in FIG. 5, the device includes:
a processor; and
a memory configured to store executable instructions of the processor.

The processor is configured to:
read the executable instructions from the memory, and execute the instructions to implement the method for processing intraoral scanning provided by embodiments of the present disclosure.

Referring to FIG. 5 below, FIG. 5 illustrates a schematic structural diagram of an electronic device 400 suitable for implementing an embodiment of the present disclosure. The terminal device 400 in this embodiment of the present disclosure may include. but is not limited to mobile terminals such as a mobile phone, a notebook computer, a digital radio receiver, a personal digital assistant (PDA), a portable Android device (PAD), a portable media player (PMP), a vehicle-mounted terminal (e.g., a vehicle-mounted navigation terminal), and fixed terminals such as a digital TV and a desktop computer. The electronic device shown in FIG. 5 is merely an example, which should not impose any limitations on functions and application ranges of this embodiment of the present disclosure.

As shown in FIG. 5, the electronic device 400 may include a processing apparatus (e.g., a central processing unit and a graphics processing unit) 401, which may perform various appropriate actions and processing according to programs stored on a read only memory (ROM) 402 or loaded from a storage apparatus 408 into a random access memory (RAM) 403. The RAM 403 further stores various programs and data required for the operation of the electronic device 400. The processing apparatus 401, the ROM 402, and the RAM 403 are connected to one another through a bus 404. An input/output (I/O) interface 405 is also connected to the bus 404.

Typically, the following apparatuses may be connected to the I/O interface 405: an input apparatus 406, including, for example, a touchscreen, a touchpad, a keyboard, a mouse, a camera, a microphone, an accelerometer, and a gyroscope; an output apparatus 407, including, for example, a liquid crystal display (LCD), a speaker, and a vibrator; the storage apparatus 408, including, for example, a magnetic tape and a hard disk; and a communication apparatus 409. The communication apparatus 409 may allow the electronic device 400 to be in wireless or wired communication with other devices for data exchange. Although FIG. 5 illustrates the electronic device 400 with various apparatuses, it is to be understood that it is not necessary to implement or have all the shown apparatuses. Alternatively, more or fewer apparatuses may be implemented or provided.

Particularly, the foregoing process described with reference to the flowchart according to the embodiments of the present disclosure may be implemented as a computer software program. For example, an embodiment of the present disclosure includes a computer program product including a computer program carried on a non-transitory computer-readable medium. The computer program includes program code for executing the method shown in the flowchart. In such an embodiment, the computer program may be downloaded and installed from a network by the communication apparatus 409, or installed from the storage apparatus 408, or installed from the ROM 402. The computer program, when executed by the processing apparatus 401, performs the above functions defined in the method for processing intraoral scanning in embodiments of the present disclosure.

It should be noted that the computer-readable medium in the present disclosure may be a computer-readable signal medium, or a computer-readable storage medium, or any combination thereof. For example, the computer-readable storage medium may include, but is not limited to: electrical, magnetic, optical, electromagnetic, infrared, or semiconductor systems, apparatuses, or devices, or any combination thereof. More specific examples of the computer-readable storage medium may include, but are not limited to: an electrical connection with one or more wires, a portable computer disk, a hard disk, a random access memory (RAM), a read only memory (ROM), an erasable programmable read only memory (EPROM or a flash memory), fiber optics, a portable compact disc read only memory (CD-ROM), an optical storage device, a magnetic storage device, or any proper combination of the above. In the present disclosure, the computer-readable storage medium may be any tangible medium including or storing a program, and the program may be used by an instruction execution system, apparatus, or device, or used in conjunction with the instruction execution system, apparatus, or device. However, in the present disclosure, the computer-readable signal medium may include data signals propagated in a baseband or propagated as a part of a carrier wave, which carry computer-readable program code. The propagated data signals may have a plurality of forms, including, but not limited to, electromagnetic signals, optical signals, or any proper combination of the above. The computer-readable signal medium may be any computer-readable medium other than the computer-readable storage medium. The computer-readable signal medium may send, propagate, or transmit the program used by the instruction execution system, apparatus, or device, or used in conjunction with the instruction execution system, apparatus, or device. The program code included in the computer-readable medium may be transmitted by any proper medium including, but not limited to, a wire, an optical cable, radio frequency (RF), etc., or any proper combination of the above.

In some implementations, a client and a server can communicate using any currently known or future-developed network protocols such as a hyper text transfer protocol (HTTP), and may also be can be in communication connection with digital data in any form or medium (e.g., a communication network). For example, examples of the communication network include a local area network ("LAN"), a wide area network ("WAN"), Internet work (e.g., Internet), a peer-to-peer network (e.g., an ad hoc peer-to-peer network), and any currently known or future-developed networks.

The computer-readable medium may be included in the electronic device; and may separately exist without being assembled in the electronic device.

The computer-readable medium carries one or more programs. The one or more programs, when executed by the electronic device, enable the electronic device to: receive an information display trigger operation of a user in a video playing process; acquire at least two pieces of target information associated with a video; display first target information from the at least two pieces of target information in an information display region of a video playing page, where the size of the information display region is less than that of the playing page; and receive a first switching trigger operation of the user, and switch the first target information displayed in the information display region into second target information from the at least two pieces of target information.

The computer program code for executing the operations of the present disclosure may be written in one or more programming languages or a combination thereof. The programming languages include, but are not limited to, object-oriented programming languages such as Java, Smalltalk, C++, as well as conventional procedural programming languages such as "C" or similar programming languages. The program code may be executed entirely or partially on a user computer, executed as a standalone software package, executed partially on the user computer and partially on a remote computer, or executed entirely on the remote computer or a server. In the case of involving the remote computer, the remote computer may be connected to the user computer via any type of network, including a local area network (LAN) or a wide area network (WAN), or may be connected to an external computer (e.g., utilizing an Internet service provider for Internet connectivity).

The flowcharts and block diagrams in the drawings illustrate system architectures, functions, and operations possibly implemented by the system, method and computer program product according to the various embodiments of the present disclosure. In this regard, each block in the flowcharts or block diagrams may represent a component, a program segment, or a portion of code, and the component, program segment, or portion of code includes one or more executable instructions for implementing specified logical functions. It should be noted that in some alternative implementations, functions marked in the blocks may also occur in an order different from that marked in the drawings. For example, two consecutively-shown blocks may actually be executed in parallel basically, but sometimes may also be executed in a reverse order, which depends on involved functions. It should be further noted that each block in the block diagrams and/or flowcharts as well as a combination of the blocks in the block diagrams and/or flowcharts may be implemented by using a dedicated hardware-based system that executes specified functions or operations, or using a combination of special hardware and computer instructions.

The units described in the embodiments of the present disclosure may be implemented through software or hardware. The name of the unit does not limit the unit in certain cases.

The functions described herein above may be at least partially executed by one or more hardware logic components. For example, exemplary hardware logic components that can be used include, but are not limited to, a field-programmable gate array (FPGA), an application specific integrated circuit (ASIC), an application specific standard part (ASSP), a system on chip (SOC), a complex programmable logic device (CPLD), etc.

In the context of the present disclosure, a machine-readable medium may be a tangible medium that may contain or store a program for use by the instruction execution system, apparatus, or device, or in conjunction with the instruction execution system, apparatus, or device. The machine-readable medium may be a machine-readable signal medium or a machine-readable storage medium. The machine-readable medium may include, but is not limited to: electronic, magnetic, optical, electromagnetic, infrared, or semiconductor systems, apparatuses, or devices, or any proper combination of the above. More specific examples of the machine-readable storage medium may include: an electrical connection based on one or more wires, a portable computer disk, a hard disk, a random access memory (RAM), a read only memory (ROM), an erasable programmable read only memory (EPROM or a flash memory), fiber optics, a portable compact disc read only memory (CD-ROM), an optical storage device, a magnetic storage device, or any proper combination of the above.

According to one or more embodiments of the present disclosure, the present disclosure provides an electronic device, including:
  a processor; and
  a memory configured to store executable instructions of the processor.

The processor is configured to read the executable instructions from the memory, and execute the instructions to implement any one of the methods for processing intraoral scanning provided by the present disclosure.

According to one or more embodiments of the present disclosure, the present disclosure provides a non-transitory computer-readable storage medium. The non-transitory computer-readable storage medium stores a computer program. The computer program is configured to implement any one of the methods for processing intraoral scanning provided by the present disclosure.

It should be noted that herein, relational terms such as "first" and "second" are used only to distinguish one entity or operation from another and do not necessarily require or imply any actual relationship or order between these entities or operations. In addition, terms "comprise", "include" or any other variations thereof are intended to cover non-exclusive inclusion, and therefore a process, a method, an article, or a device including a series of elements not only includes those elements but also includes other elements not clearly listed, or further includes inherent elements for the process, the method, the article, or the device. In the absence of further restrictions, an element specified by the phrase "including a . . . " does not exclude the existence of other identical elements in the process, method, article, or device that includes the element.

The above contents are merely specific implementations of the present disclosure, such that those skilled in the art can understand or implement the present disclosure. More modifications to these embodiments are apparent to those skilled in the art, and general principles defined herein may be implemented in other embodiments without departing from the spirit or scope of the present disclosure. Thus, the present disclosure will not be limited by these embodiments shown herein but is required to conform to a widest scope consistent with the principles and novel characteristics disclosed herein.

INDUSTRIAL APPLICABILITY

The method for processing intraoral scanning provided by the present disclosure can obtain the positioning information of the scan posts based on the scanning result, satisfies the requirement for positioning the scan posts in the intraoral scanning scenario, and has high industrial applicability.

What is claimed is:

1. A method for processing intraoral scanning, comprising:
  obtaining a positioning mode of a scan post in response to a request for scanning an oral cavity comprising scan posts;
  scanning the oral cavity to obtain target scanning data; and
  performing processing based on the positioning mode of the scan post and the target scanning data to determine positioning information of the scan posts;
  wherein the performing processing based on the positioning mode of the scan post and the target scanning data to determine positioning information of the scan posts comprises: extracting auxiliary feature point information of texture images in the positioning mode of the scan post; performing three-dimensional reconstruction based on the auxiliary feature point information to obtain three-dimensional data of auxiliary feature points; and determining a scan post three-dimensional model based on the three-dimensional data of the auxiliary feature points, and determining the positioning information of the scan posts based on the scan post three-dimensional model.

2. The method for processing intraoral scanning as claimed in claim 1, wherein the obtaining the positioning mode of the scan post in response to the request for scanning the oral cavity comprising scan posts comprises:
  obtaining scanning request parameters based on a scanning request;

determining a scanning request scenario based on the scanning request parameters; and obtaining the positioning mode of the scan post based on the scanning request scenario.

3. The method for processing intraoral scanning as claimed in claim 1, wherein the scanning the oral cavity to obtain the target scanning data comprises:

controlling a scanner projector to project a structured light pattern onto the oral cavity, and controlling a first camera to perform image acquisition to obtain structured light images;

controlling a lighting element to project illumination light onto the oral cavity, and controlling a second camera to perform image acquisition to obtain texture images; and taking the structured light images and the texture images as the target scanning data.

4. The method for processing intraoral scanning as claimed in claim 3, wherein the method further comprising:

performing texture mapping on scan post three-dimensional model and the texture images based on pixel coordinates of the structured light images, pixel coordinates of the texture images, and internal and external parameters of the first camera and the second camera.

5. The method for processing intraoral scanning as claimed in claim 1, further comprising:

receiving a scanning mode switching request, and obtaining a normal scanning mode; and performing, in the normal scanning mode, three-dimensional reconstruction based on structured light images in the target scanning data to obtain a scan post three-dimensional model, and performing texture mapping on the scan post three-dimensional model and texture images in the target scanning data.

6. A system for processing intraoral scanning, comprising a scanner and a processing component, the scanner is configured to obtain a positioning mode of a scan post in response to a request for scanning an oral cavity comprising scan posts, and scan the oral cavity to obtain target scanning data; and the processing component is configured to perform processing based on the positioning mode of the scan post and the target scanning data to determine positioning information of the scan posts;

wherein the processing component is configured to: extract auxiliary feature point information of texture images in the positioning mode of the scan post; perform three-dimensional reconstruction based on the auxiliary feature point information to obtain three-dimensional data of auxiliary feature points; and determine a scan post three-dimensional model based on the three-dimensional data of the auxiliary feature points, and determine the positioning information of the scan posts based on the scan post three-dimensional model.

7. The system for processing intraoral scanning as claimed in claim 6, wherein the scanner comprises: a camera and a lighting element; and the lighting element projects illumination light onto the oral cavity, the camera performs image acquisition, and obtains texture images as the target scanning data.

8. The system for processing intraoral scanning as claimed in claim 6, wherein the scanner is further configured to:

obtain scanning request parameters based on a scanning request;

determine a scanning request scenario based on the scanning request parameters; and obtain the positioning mode of the scan post based on the scanning request scenario.

9. The system for processing intraoral scanning as claimed in claim 6, wherein the scanner is further configured to:

control a scanner projector to project a structured light pattern onto the oral cavity, and control a first camera to perform image acquisition to obtain structured light images;

control a lighting element to project illumination light onto the oral cavity, and control a second camera to perform image acquisition to obtain texture images; and take the structured light images and the texture images as the target scanning data.

10. The system for processing intraoral scanning as claimed in claim 9, wherein the processing component is further configured to:

perform texture mapping on scan post three-dimensional model and the texture images based on pixel coordinates of the structured light images, pixel coordinates of the texture images, and internal and external parameters of the first camera and the second camera.

11. The system for processing intraoral scanning as claimed in claim 6, wherein the processing component is further configured to:

receive a scanning mode switching request, and obtain a normal scanning mode; and perform, in the normal scanning mode, three-dimensional reconstruction based on structured light images in the target scanning data to obtain a scan post three-dimensional model, and perform texture mapping on the scan post three-dimensional model and texture images in the target scanning data.

12. The system for processing intraoral scanning as claimed in claim 6, wherein the scan post comprises a scan post component used for connecting to an implant, and an auxiliary component connected with the scan post component, the scan post component and/or the auxiliary component are/is provided with auxiliary feature points.

13. The system for processing intraoral scanning as claimed in claim 12, wherein the scan post has target features, and the target features are continuously distributed on the scan post component and/or the auxiliary component, and the target features are distributed non-unilaterally on the scan post component and/or the auxiliary component.

14. The system for processing intraoral scanning as claimed in claim 13, wherein the processing component is further configured to:

obtain a plurality of frames of images;

acquire initial three-dimensional data of the oral cavity based on the plurality of frames of images, and the initial three-dimensional data comprises an initial point set of the oral cavity and three-dimensional coordinate measured values of the target features in a same coordinate system;

obtain a preset model of the scan post, and the preset model comprises three-dimensional coordinate true values of the target features and a real point set of the scan post in the same coordinate system, wherein the real point set refers to three-dimensional coordinate true values of various points of the scan post;

stitch the initial point set of the oral cavity and the real point set of the scan post based on a corresponding relationship between three-dimensional coordinate measured values of the target features and the three-dimensional coordinate true values; and determine the positioning information of the scan post based on the stitched real point set of the scan post.

15. An electronic device, comprising:
a processor; and
a memory configured to store executable instructions of the processor,
the processor is configured to read the executable instructions from the memory, and execute the executable instructions to:
obtain a positioning mode of a scan post in response to a request for scanning an oral cavity comprising scan posts;
scan the oral cavity to obtain target scanning data; and
perform processing based on the positioning mode of the scan post and the target scanning data to determine positioning information of the scan posts;
the processor is further configured to: extract auxiliary feature point information of texture images in the positioning mode of the scan post; perform three-dimensional reconstruction based on the auxiliary feature point information to obtain three-dimensional data of auxiliary feature points; and determine a scan post three-dimensional model based on the three-dimensional data of the auxiliary feature points, and determine the positioning information of the scan posts based on the scan post three-dimensional model.

16. The method for processing intraoral scanning as claimed in claim 1, wherein the scan post comprises a scan post component used for connecting to an implant, and an auxiliary component connected with the scan post component, the scan post component and/or the auxiliary component are/is provided with auxiliary feature points.

17. The method for processing intraoral scanning as claimed in claim 16, wherein the scan post has target features, and the target features are continuously distributed on the scan post component and/or the auxiliary component, and the target features are distributed non-unilaterally on the scan post component and/or the auxiliary component.

18. The method for processing intraoral scanning as claimed in claim 17, the method further comprising:
obtaining a plurality of frames of images;
acquiring initial three-dimensional data of the oral cavity based on the plurality of frames of images, and the initial three-dimensional data comprises an initial point set of the oral cavity and three-dimensional coordinate measured values of the target features in a same coordinate system;
obtaining a preset model of the scan post, and the preset model comprises three-dimensional coordinate true values of the target features and a real point set of the scan post in the same coordinate system, wherein the real point set refers to three-dimensional coordinate true values of various points of the scan post;
stitching the initial point set of the oral cavity and the real point set of the scan post based on a corresponding relationship between three-dimensional coordinate measured values of the target features and the three-dimensional coordinate true values; and
determining the positioning information of the scan post based on the stitched real point set of the scan post.

* * * * *